US011200145B2

(12) United States Patent
Peng et al.

(10) Patent No.: US 11,200,145 B2
(45) Date of Patent: Dec. 14, 2021

(54) AUTOMATIC BUG VERIFICATION

(71) Applicant: EMC IP Holding Company LLC, Hopkinton, MA (US)

(72) Inventors: Fei Peng, Chengu (CN); Yi Jiang, Chengu (CN); Zhongyi Zhou, Chengu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 73 days.

(21) Appl. No.: 16/284,544

(22) Filed: Feb. 25, 2019

(65) Prior Publication Data

US 2020/0117574 A1    Apr. 16, 2020

(30) Foreign Application Priority Data

Oct. 12, 2018    (CN) .......................... 201811191297.9

(51) Int. Cl.
*G06F 11/36*    (2006.01)
*G06N 20/00*    (2019.01)

(52) U.S. Cl.
CPC ...... *G06F 11/3608* (2013.01); *G06F 11/3688* (2013.01); *G06N 20/00* (2019.01)

(58) Field of Classification Search
CPC ............. G06F 11/3608; G06F 11/3664; G06F 11/3672; G06F 2201/81; G06N 20/00
See application file for complete search history.

(56) References Cited

U.S. PATENT DOCUMENTS

| | | | |
|---|---|---|---|
| 2011/0321007 A1* | 12/2011 | Marum | G06F 8/65 717/113 |
| 2018/0260309 A1* | 9/2018 | Simoni | G06F 11/3608 |
| 2018/0267887 A1* | 9/2018 | Dsouza | G06F 11/3688 |

OTHER PUBLICATIONS

Mattia Fazzini, "Automatically Translating Bug Reports into Ttest Cases for Mobile Apps", Jul. 16-21, 2018, ISSTA'18, pp. 141-152 (Year: 2018).*

* cited by examiner

*Primary Examiner* — Bryce P Bonzo
*Assistant Examiner* — Michael Xu
(74) *Attorney, Agent, or Firm* — Chamberlain, Hrdlicka, White, Williams & Aughtry

(57) ABSTRACT

Embodiments of the present disclosure relate to a method, device and computer program product for software bug verification. In one embodiment, the method includes determining a test action for verification of a software bug to be verified based on an identification of the software bug. The method further includes determining similarities between the test action and a plurality of historical test actions. The method further includes in response to a similarity between the test action and at least one of the plurality of historical test actions exceeding a threshold similarity, associating the test action with a code fragment category associated with the at least one historical test action. The method further includes verifying the software bug by running one code fragment in the code fragment category.

12 Claims, 4 Drawing Sheets

AUTOMATIC BUG VERIFICATION

FIELD

The present disclosure generally relates to information processing systems, and more specifically, to automatic software bug verification.

BACKGROUND

Software bug verification is a conventional part of software development. Usually, when there is a need for software bug verification, testers will write manual test cases in a natural language. The manual test cases include a set of test actions that must be followed and performed by the testers to verify software bugs.

In many cases, a process of automatic software bug verification is required. Automation allows test cases to be run automatically for testing software. In order to automatically execute test cases, testers need to write automation test scripts for manual test cases by using given programming language. However, it might take testers considerable time and effort to manually write or develop such automation test scripts.

SUMMARY

Embodiments of the present disclosure provide a method, device and computer program product for software bug verification.

In a first aspect of the present disclosure, there is provided a method for software bug verification. The method comprises determining a test action for verification of a software bug to be verified based on an identification of the software bug. The method also comprises determining similarities between the test action and a plurality of historical test actions. The method also comprises in response to a similarity between the test action and at least one of the plurality of historical test actions exceeding a threshold similarity, associating the test action with a code fragment category associated with the at least one historical test action. The method further comprises verifying the software bug by running one code fragment in the code fragment category.

In some embodiments, determining similarities between the test action and the plurality of historical test actions comprises converting texts of the plurality of historical test actions to a first plurality of vectors, converting a text of the test action to a second vector, and determining the similarities between the test action and the plurality of historical test actions based on distances between the second vector and the first plurality of vectors.

In some embodiments, associating the test action with the code fragment category comprises in response to similarities between the test action and a first number of historical test actions among the plurality of historical test actions exceeding the threshold similarity, determining code fragment categories associated with the first number of historical test actions, determining the number of historical test actions associated with each of the determined code fragment categories, and, in response to a proportion of the number of historical test actions associated with a first one of the determined code fragment categories to the first number being greater than a threshold proportion, associating the test action with the first code fragment category.

In some embodiments, the method further comprises associating more than one of the plurality of historical test actions with each of the plurality of code fragment categories by clustering code fragments associated with the plurality of historical test actions into the plurality of code fragment categories.

In some embodiments, the method further comprises determining hardware resources for verification of the software bug to be verified based on the identification of the software bug, selecting the hardware resources from a hardware resource pool, and running the code fragment on the selected hardware resources.

In a second aspect, there is provided an electronic device. The device comprises at least one processor and at least one memory comprising computer program instructions. The at least one memory and the computer program instructions are configured to, with the at least one processor, cause the device to perform acts, including: determining a test action for verification of a software bug to be verified based on an identification of the software bug, determining similarities between the test action and a plurality of historical test actions, in response to a similarity between the test action and at least one of the plurality of historical test actions exceeding a threshold similarity, associating the test action with a code fragment category associated with the at least one historical test action, and verifying the software bug by running one code fragment in the code fragment category.

In a third aspect, there is provided a computer program product. The computer program product is tangibly stored on a non-transient computer readable medium and comprises machine executable instructions which, when executed, cause a machine to execute steps of the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of example embodiments of the present disclosure in the accompanying drawings, the above and other objects, features and advantages of the present disclosure will become more apparent, wherein the same references generally refer to the same components in the embodiments of the present disclosure.

The same or similar reference numerals represent the same or similar components throughout the figures.

DETAILED DESCRIPTION

Example embodiments of the present disclosure will be described in more detail with reference to the accompanying drawings, in which the example embodiments of the present disclosure have been illustrated. However, it is to be understood that the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As used herein, the term "includes" and its variants are to be read as open terms that mean "includes, but is not limited to." The term "based on" is to be read as "based at least in part on." The terms "one example embodiment" and "one embodiment" are to be read as "at least one example." The term "another embodiment" is to be read as "at least one other embodiment." The terms "first," "second," and the like may refer to different or same objects. Other definitions, explicit and implicit, may be included below.

As used herein, for the sake of description, test actions used as training data are also referred to as "historical test actions."

As described above, it might take testers significant time and effort to manually write or develop automation test scripts for software bug verification.

According to embodiments of the present disclosure, there is proposed a solution for automatic software bug verification. In this solution, associations between historical test actions and code fragment categories are generated by using a machine learning algorithm. A test action for verification of a software bug to be verified is determined based on an identification of the software bug. The test action is classified into a code fragment category based on associations between historical test actions and code fragment categories. Finally, the software bug is verified by running one code fragment in the code fragment category. The solution for automatic software bug verification according to the present disclosure saves time and effort for testers.

With reference to the accompanying drawings, detailed description is presented to embodiments of the present disclosure.

Figure 1:
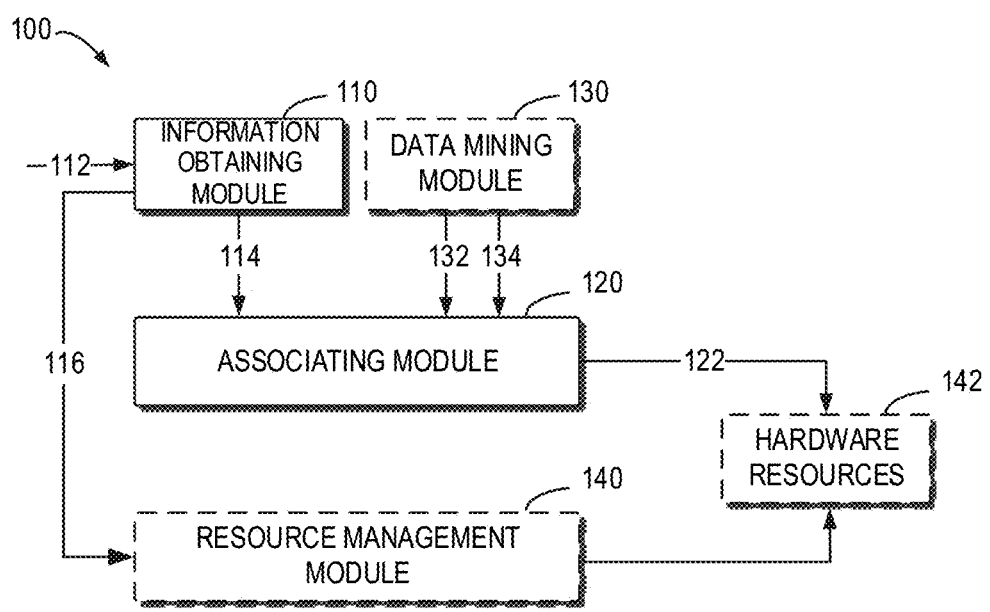
FIG. 1 shows a schematic view of an example computing device in which embodiments of the present disclosure can be implemented.

FIG. 1 shows a schematic view of an example computing device 100 in which embodiments of the present disclosure can be implemented. The computing device 100 includes an information obtaining module 110 and an associating module 120.

The information obtaining module 110 is configured to determine a test action 114 for verifying a software bug to be verified based on an identification (ID) 112 of the software bug. In some embodiments, the information obtaining module 110 may include a crawler for crawling software bug information from a software bug management tool based on the ID of the software bug to be verified. In some embodiments, the software bug information may comprise a test action 114 for verifying the software bug. In other embodiments, the software bug information may further include information 116 of hardware resources for verifying the software bug. Thereby, the information obtaining module 110 may utilize the crawler to obtain the software bug information and then determine the test action 114 for verifying the software bug.

The associating module 120 is configured to determine similarities between the test action for verification of the software bug and a plurality of historical test actions. If a similarity between the test action and at least one of the plurality of historical test actions exceeds a threshold similarity, the associating module 120 is configured to associate the test action with a code fragment category associated with the at least one historical test action.

In some embodiments, the associating module 120 is configured to determine code fragment categories associated with the first number of historical test actions if similarities between the test action and a first number of historical test actions among the plurality of historical test actions exceed the threshold similarity. The associating module 120 is further configured to determine the number of historical test actions associated with each of the determined code fragment categories. If a proportion of the number of historical test actions associated with a first code fragment category among the determined code fragment categories to the first number is greater than a threshold proportion, the associating module 120 is configured to classify the test action into the first code fragment category. In some embodiments, the first number may be determined in advance. In some embodiments, the first number may range between 5 and 15. In some embodiments, the threshold proportion may be any appropriate value, for example, between 40% and 70%. Of course, any other appropriate range is also possible depending on specific demands and environment.

Consider the following example in which the first number is 10 and the threshold proportion is 60%. The determined similarities may be sorted in decreasing order, and the first to tenth historical test actions may be selected. A similarity between the test action and the tenth historical test action may be used as the threshold similarity. Further, code fragment categories associated with the selected ten historical test actions may be determined. For example, out of the ten historical test actions, seven historical test actions may be associated with the first code fragment category, two historical test actions may be associated with a second code fragment category, and one historical test action may be associated with a third code fragment category. Since the proportion of the number (i.e., seven) of historical test actions associated with the first code fragment category to the first number (i.e., ten) is greater than the threshold proportion (60%), the test action may be associated with the first code fragment category.

In some embodiments, the computing device 100 may further include a data mining module 130. The data mining module 130 is configured to associate a historical test action with a code fragment category based on training data. In some embodiments, the data mining module 130 provides a historical test action 132 and a code fragment category 134 associated with the historical test action 132 to the associating module 120.

To associate a historical test action with a code fragment category, the data mining module 130 needs to obtain corresponding training data. The training data to be obtained may include manual test cases and automation test cases associated with the manual test cases. In some embodiments, the data mining module 130 is configured to obtain manual test cases from a test case management repository (not shown) and obtain automation test cases from a storage device (not shown). Each of the manual test cases includes a test case ID, and each of the automation test cases also includes a test case ID. If the test case ID of a manual test case is the same as that of an automation test case, the manual test case may be associated with the automation test case.

Figure 2:
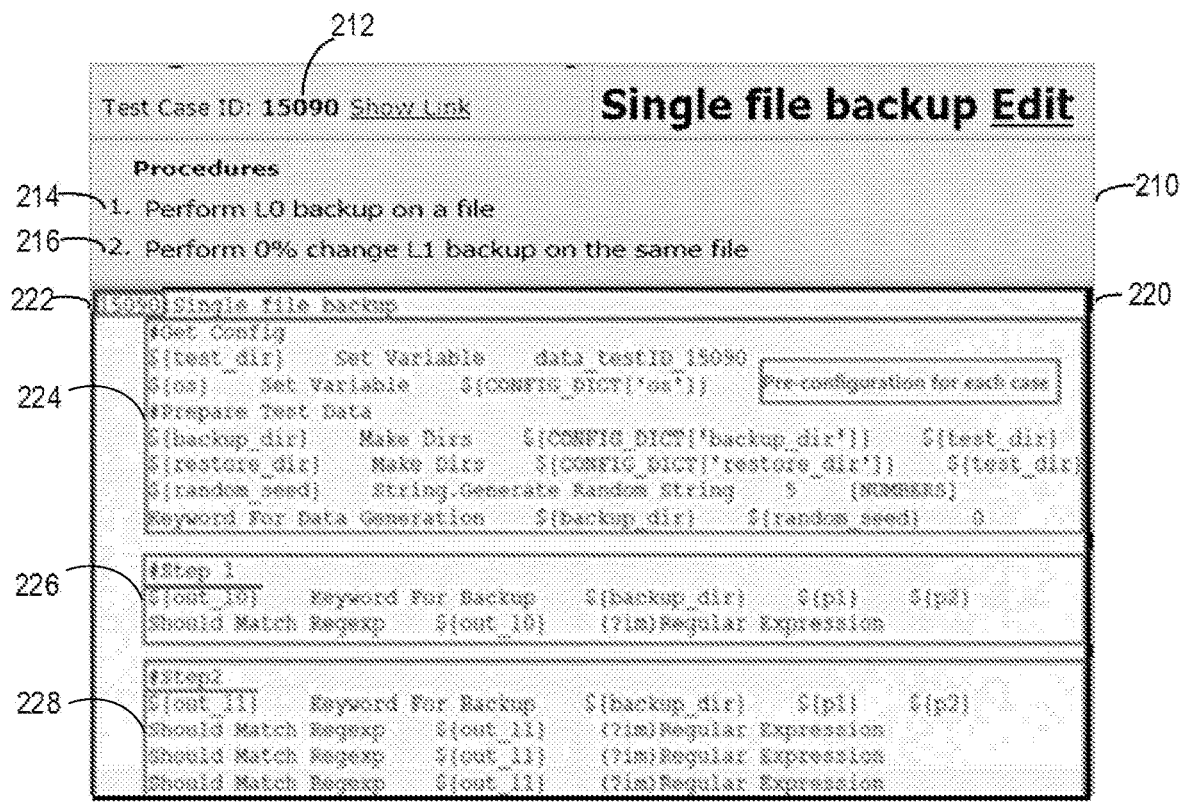
FIG. 2 shows respective examples of a manual test case and an automation test case associated with the manual test case.

FIG. 2 shows respective examples of a manual test case and an automation test case associated with the manual test case. As shown, a manual test case 210 comprises a test case ID 212 and test actions 214 and 216. An automation test case 220 comprises a test case ID 222 and code fragments 224 and 226. Because both the test case ID 212 of the manual test case 210 and the test case ID 222 of the automation test case 220 are 15090, the manual test case 210 may be associated with the automation test case 220.

In some embodiments, associations between manual test cases and automation test cases may be stored by using a matrix as below:

$$\begin{pmatrix} case\_1 \cdot txt & case\_1\_script \cdot txt \\ case\_2 \cdot txt & case\_2\_script \cdot txt \\ \vdots & \vdots \\ case\_x \cdot txt & case\_x\_script \cdot txt \end{pmatrix} \quad \text{Matrix 1}$$

Matrix 1 comprises a first column and a second column. The first column lists manual test cases. The second column lists automation test cases associated with the manual test cases. For example, a manual test case with ID of "case_1" is associated with an automation test case with ID of "case_1," a manual test case with ID of "case_2" is associated with an automation test case with ID of "case_2," etc.

Usually, each row in the manual test case represents one test action. Therefore, a plurality of historical test actions in the manual test case may be split by row. For example, in the example of FIG. 2, the splitting by row results in the historical test actions 214 and 216.

In addition, the automation test case includes a plurality of code fragments, and the start of each of the code fragments includes an annotation beginning with "#." Therefore, "#" may be used as a delimiter to split the plurality of code fragments in the automation test case. Generally, a starting code fragment in the automation test case is a general configuration of each automation test case and has no historical test action associated therewith. Thus, the starting code fragment may be ignored. For example, in the example of FIG. 2, the automation test case 220 includes code fragments 224, 226 and 228, and the start of each of the code fragments includes an annotation beginning with "#." Therefore, the code fragments 224, 226 and 228 may be split by using "#."

In some embodiments, a position of a historical test action in the manual test case may indicate a code fragment associated with this historical test action. For example, in the example of FIG. 2, the historical test action 214 is in the first row of the manual test case 210, and thus the historical test action 214 is associated with the first code fragment 226 other than the code fragment 224 used as the general configuration in the automation test case 220. Similarly, the historical test action 216 is in the second row of the manual test case 210, and thus the historical test action 216 is associated with the second code fragment 228 other than the code fragment 224 used as the general configuration in the automation test case 220.

In some embodiments, associations between historical test actions and code fragments may be stored by using a matrix as shown below:

$$\begin{pmatrix} [step1, step2 \ldots] & [C1, C2 \ldots] \\ [step1, step2 \ldots] & [C1, C2 \ldots] \\ \vdots & \vdots \\ [step1, step2 \ldots] & [C1, C2 \ldots] \end{pmatrix} \quad \text{Matrix 2}$$

Matrix 2 is similar to Matrix 1 as described above. However, in Matrix 2, the automation test case has been split into code fragments. Specifically, Matrix 2 includes the first column and the second column. The first column includes a list of historical test actions from manual test cases. The second column includes a list of code fragments from associated automation test cases. Each row in Matrix 2 includes a list of historical test actions in a manual test case and a list of code fragments in an automation test case associated with the manual test case.

For example, the first row in Matrix 2 includes a list "[step1, step2 ... ]" of historical test actions in a first manual test case and a list "[C1, C2 ... ]" of code fragments in a first automation test case associated with the first manual test case. Similarly, the second row in Matrix 2 comprises a list "[step1, step2 ... ]" of historical test actions in a second manual test case and a list "[C1, C2 ... ]" of code fragments in a second automation test case associated with the second manual test case.

The order or position of an element in the list is used to indicate a corresponding element with which the element is associated. For example, in the first row of the matrix, a historical test action "step1" is in the first column of the list of historical test actions. A code fragment "C1" is also in the first column of the list of corresponding code fragments. Therefore, the historical test action "step1" is associated with the code fragment "C1." A historical test action "step2" is in the second column of the list of historical test actions. A code fragment "C2" is also in the second column of the list of corresponding code fragments. Therefore, the historical test action "step2" is associated with the code fragment "C2."

In some embodiments, to associate a single historical test action with a single code fragment, the list "[step1, step2 ... ]" of historical test actions in the first column of Matrix 2 may be split into various historical test actions, and the list "[step1, step2 ... ]" of code fragments in the second column of Matrix 2 may be split into various code fragments. Thereby, Matrix 2 may be updated to Matrix 3 as below:

$$\begin{pmatrix} step\_1 & C1 \\ step\_2 & C2 \\ step\_3 & C3 \\ \vdots & \vdots \\ \vdots & \vdots \\ \vdots & \vdots \\ step\_x & Cx \end{pmatrix} \quad \text{Matrix 3}$$

Matrix 3 includes the first column and the second column. The first column lists historical test actions, and the second column lists code fragments associated with historical test actions. For example, the first row of Matrix 3 comprises a historical test action "step_1" and a code fragment "C1" associated with the historical test action "step_1". The second row of Matrix 3 comprises a historical test action "step_2" and a code fragment "C2" associated with the historical test action "step_2".

In Matrix 3, each historical test action is associated with a code fragment. Usually, code fragments "C1," "C2" ... "Cx" might include the same or similar code fragments. In some embodiments, to quickly associate a test action for software bug verification with a code fragment, the data mining module 130 is configured to associate more than one of the plurality of historical test actions "step_1," "step_2" ... "step_x" with each of the plurality of code fragment categories by clustering the code fragments "C1," "C2" . . . "Cx" associated with the plurality of historical test actions "step_1," "step_2" . . . "step_x" into the plurality of code fragment categories.

In some embodiments, to cluster the plurality of code fragments into the plurality of code fragment categories, the data mining module 130 is configured to convert the plurality of code fragments from text to a vector.

In some embodiments, the data mining module 130 is configured to convert the plurality of code fragments from text to a vector by calculating a word frequency-inverse document frequency (TF-IDF) for each word in a code fragment collection formed by the plurality of code fragments.

The main idea of TF-IDF is: if a word appears frequently in a document and rarely appears in other documents, the word is considered to have good class discrimination and is suitable for classification. The value of TF-IDF is the product of a word frequency and an inverse document frequency.

TF represents a frequency that a word occurs in a document. For example, consider a scenario in which a document d contains 1000 words and a word t occurs 3 times in the document d, the frequency that the word t occurs in the document d is 3.

Considering different documents may have different lengths, and a single word might have greater TF in a long document than that in a short document, usually TF is normalized by dividing TF by the total number of words in the document d. In this regard, the normalized word frequency $tf_{td}$ may be represented as:

$$tf_{td} = \frac{\text{frequency that term } t \text{ occurs in document } d}{\text{total terms in document } d} \quad (1)$$

On the other hand, different words may have different weights for each document. Therefore, in the natural language processing field, IDF is introduced as a general importance metric of a word. The IDF for a word can be obtained by dividing the total number of documents in the document collection by the number of documents containing the word, and then taking the obtained quotient as the logarithm of the bottom 2, that is:

$$idf_t = \log_2\left(\frac{N}{ft}\right) \quad (2)$$

where N represents the total number of documents in the document collection, and ft represents the number of documents containing the word t. Thereby, the value of TF-IDF for the word t may be represented as $tf_{td}*idf_t$.

In some embodiments, to cluster the plurality of code fragments into the plurality of code fragment categories, a TF-IDF value matrix may be established for the plurality of code fragments. For example, the TF-IDF value matrix may be represented as Table 1:

TABLE 1

|     | word_1   | word_2   | ... | ... | word_j   |
|-----|----------|----------|-----|-----|----------|
| C_1 | $C_{11}$ | ...      | ... | ... | ...      |
| C_2 | ...      | $C_{22}$ | ... | ... | ...      |
| ... | ...      | ...      | ... | ... | ...      |
| ... | ...      | ...      | ... | ... | ...      |
| C_i | ...      | ...      | ... | ... | $C_{ij}$ |

In Table 1, C_1, C_2 . . . C_i represent code fragments to be clustered, word_1, word_2 . . . word_j represent unique words in the code fragment collection, i represents the number of code fragments to be clustered, j represents the number of the unique words in the code fragment collection, and an element $C_{ij}$ in the TF-IDF value matrix represents a value of TF-IDF for a word j in a code fragment i.

It should be understood that converting a code fragment from text to a vector by calculating TF-IDF for each word in the code fragment is merely an example, and the scope of the present disclosure is not limited thereto. In some embodiments, other means may also be used to convert code fragments from text to a vector(s). For example, code fragments may be converted from text to a vector based on a Word2Vec model or by means of latent semantic analysis (LSA).

In some embodiments, the plurality of code fragments is clustered into the plurality of code fragment categories by using Kmeans clustering algorithm. For the purpose of description, clustering code fragments into code fragment categories are also referred to as "cluster" hereinafter.

In some embodiments, Kmean clustering algorithm may be described by using the following pseudo code.

---

Input: vectors for code fragments and the number of clusters K $\{\vec{x_1}, \vec{x_2} \ldots \vec{x_i}\}$ , K Output: clusters which contain samples $\{\vec{C_1}, \vec{C_2} \ldots \vec{C_k}\}$

Specify the desired number of clusters K, randomly select K centroids

Function Select_Random_Centroid($\{\vec{x_1}, \vec{x_2} \ldots \vec{x_i}\}$,K):

$\{\vec{p_1}, \vec{p_2} \ldots \vec{p_k}\}$ = Random ($(\{\vec{x_1}, \vec{x_2} \ldots \vec{x_i}\})$,K)

Return $\{\vec{p_1}, \vec{p_2} \ldots \vec{p_k}\}$

Put each point to the nearest cluster

Function Cluster_Points($\{\vec{x_1}, \vec{x_2} \ldots \vec{x_i}\}$, $\{\vec{p_1}, \vec{p_2} \ldots \vec{p_i}\}$):

For i in $\{\vec{x_1}, \vec{x_2} \ldots \vec{x_i}\}$:

For j in $\{\vec{p_1}, \vec{p_2} \ldots \vec{p_k}\}$:

Compare_Distance(i,j)

```
{T⃗₁, T⃗₂ ... T⃗ₖ} = Put_Points_in_Nearest_cluster(i)
# where T⃗ₖ is the temporary cluster in the calculation phase
  Return {T⃗₁, T⃗₂ ... T⃗ₖ}
#Calculate the new centroid and update it for each cluster
Function Update_Cenorid ({T⃗₁, T⃗₂ ... T⃗ₖ}):

({p⃗₁, p⃗₂ ... p⃗ₖ})=Calculate_New_Cenorid(({T⃗₁, T⃗₂ ... T⃗ₖ}))

Update({p⃗₁, p⃗₂ ... p⃗ₖ})

Return{p⃗₁, p⃗₂ ... p⃗ₖ}
Iteration:
{p⃗₁, p⃗₂ ... p⃗ₖ}=Select_Random_Centroid({x⃗₁, x⃗₂ ... x⃗ᵢ})
While Not (All_Centroids Are Closed To Converge):

({C⃗₁, C⃗₂ ... C⃗ₖ}) =Cluster_Points (({x⃗₁, x⃗₂ ... x⃗ₖ}, {p⃗₁, p⃗₂ ... p⃗ₖ}))

Update_Centroid(({T⃗₁, T⃗₂ ... T⃗ₖ})
```

In some embodiments, the elbow method may be used to determine the optimal number of clusters K. In some embodiments, in the elbow method, the optimal number of clusters K is determined based on the sum of squared errors (SSE):

$$SSE = \sum_{i=1}^{K} \sum_{p \in C_i} |p - m_i|^2$$

where $C_i$ represents the $i^{th}$ cluster which contains a set of samples, p represents the sample of cluster $C_i$, $m_i$ represents the centroid (the average value for all samples), SSE can indicate the errors for clustering. In a certain range, the smaller SSE indicates the better clustering.

Figure 3:
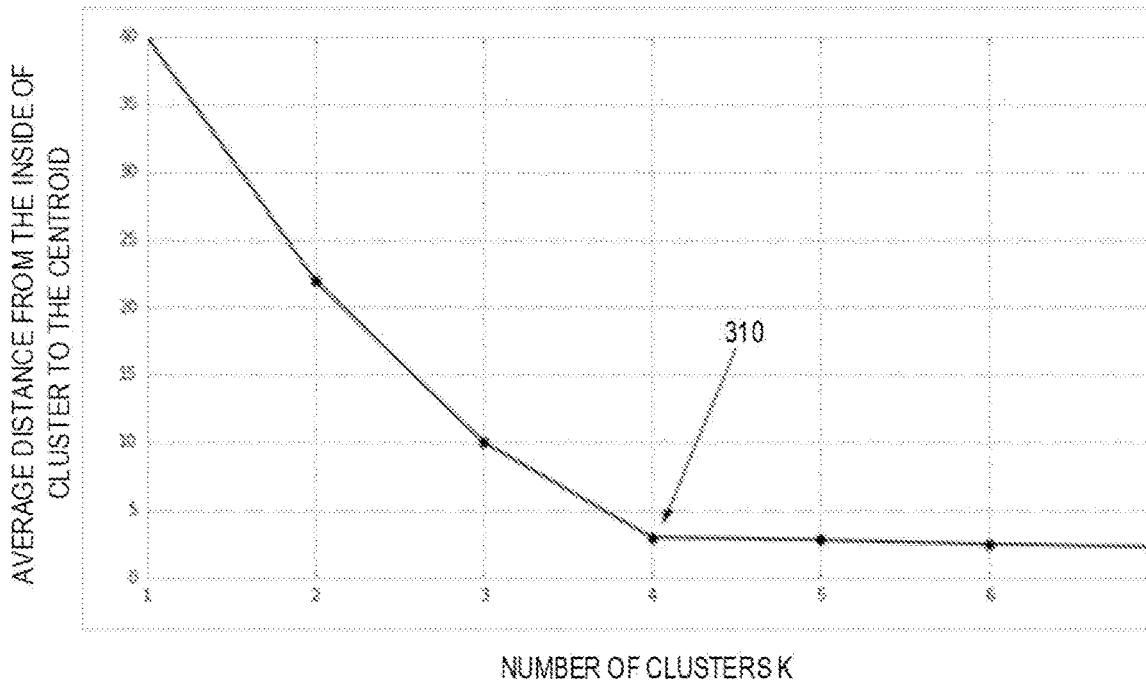
FIG. 3 shows an example graph illustrate relationship between the sum of squared errors and the number of clusters.

FIG. 3 is an example graph showing relationship between SSE and the number of clusters K. An inflection point 310 can be seen from FIG. 3. The average distance from the inside of the cluster to the centroid (i.e. SSE) reduces rapidly before the inflection point 310 and has no significant change after the inflection point 310. In the example of FIG. 3, K=4 at the infection point 310.

In some embodiments, because code fragments are clustered into the plurality of code fragment categories, each of the plurality of code fragment categories is associated with more than one historical test action. Thereby, the above Matrix 3 may be updated to Matrix 4 as below:

$$\begin{pmatrix} step\_a & step\_i & ... & ... & Method1\ Backup\ Code\ fragment \\ step\_b & step\_j & ... & ... & Method2\ Backup\ Code\ fragment \\ step\_c & step\_k & ... & ... & Method1\ Restore\ code\ fragment \\ \vdots & \vdots & ... & ... & \vdots \\ \vdots & \vdots & ... & ... & \vdots \\ \vdots & \vdots & ... & ... & \vdots \\ step\_x & step\_k & ... & ... & Authenciation\ code\ fragment \end{pmatrix} \text{Matrix 4}$$

In Matrix 4, elements in each column other than the last column represent vectors corresponding to text from historical test actions respectively, and elements in the last column represent code fragment categories associated with historical test actions respectively. For example, in the first row of Matrix 4, "step_a" in the first column represents a vector corresponding to a text of a historical test action "step_a," and "step_i" in the second column represents a vector corresponding to a text of a historical test action "step_i." The historical test actions "step_a" and "step_i" may come from the same or different manual test cases. "Method1 Backup Code Fragment" in the last column of Matrix 4 represents a code fragment category associated with the historical test actions "step_a" and "step_i." As seen from Matrix 4, different historical test actions from different manual test cases may be associated with the same code fragment category.

In some embodiments, to determine similarities between the test action for verification of the software bug and the plurality of historical test actions, the plurality of historical test actions may be converted from text to a first plurality of vectors, and the test action for verification of the software bug may be converted from text to a second vector.

In some embodiments, the historical test action or the test action for verification of the software bug may be converted from text to a vector by calculating TF-IDF for each word in the historical test action or the test action. In other embodiments, the historical test actions or the test action for verification of the software bug may be converted from text to a vector based on a Word2Vec model or by means of LSA.

In some embodiments, the similarities between the test action for verification of the software bug and the plurality of historical test actions may be determined based on distances between the second vector and the first plurality of vectors.

In some embodiments, the similarities between the test action for verification of the software bug and the plurality of historical test actions may be determined based on Euclidean distances between the second vector and the first plurality of vectors. For example, Euclidean distances between the second vector and the first plurality of vectors may be represented as below:

$$D(x,y) = \sqrt{\sum_{w=1}^{N}(S_{wx} - S_{wy})^2}$$

where N represents the number of unique words in all historical test actions, $S_{wx}$ represents the TF-IDF value for a word w in a test action x for verifying a software bug, $S_{wy}$ represents the TF-IDF value for the word w in a historical test action y, D(x,y) represents the distance between a vector associated with the test action x for verifying the software bug and a vector associated with the historical test action y.

In some embodiments, before converting the historical test actions or the test action for verification of the software bug from text to a vector, word segmentation and stopping words removing are performed on the historical test actions or the test action so as to remove interference of stopping words to similarity determination and thereby simplify subsequent processing. Stopping words usually refer to the most common words in a sentence. Examples of stopping words include, but not limited to, "a," "the," "which" and so on.

Consider an example in which a historical test action is "Create a full backup which has 1 GB data." By performing word segmentation and stopping words removing on this historical test action, the following base vector is obtained: Step=['Create', 'full', 'backup', '1', 'GB', 'data']. This base vector includes the following elements: Step[0]=Create, Step[1]=full, Step[2]=backup, Step[3]=1 and so on.

In some embodiments, the data mining module 130 may provide the above Matrix 4 to the associating module 120 row by row, so a historical test action 132 and the associated code fragment category 134 are provided. In some embodiments, the data mining module 130 may provide the historical test actions in the above Matrix 4 to the associating module 120 in the form of vectors. For example, the data mining module 130 may provide Step=['Create', 'full', 'backup', '1', 'GB', 'data'] to the associating module 120.

One specific example of the method for verifying a software bug will be described below.

In this example, historical test actions comprise:
create a dataset backup;
restore the last backup; and
perform the replication.

Code fragment categories associated with the three historical test actions are Backup, Restore and Replication respectively, that is,
create a dataset and backup→Backup
restore the last backup→Restore
perform the replication→Replication After performing stopping words removing on the three historical test actions, the following historical test actions may be obtained:
create dataset backup
restore last backup
perform replication In this example, by calculating the TF-IDF value for each word in the three historical test actions, the three historical test actions are converted to three first vectors, as shown in Table 2 below:

TABLE 2

| Code fragment category | Test actions | Unique Words | | | | | | |
|---|---|---|---|---|---|---|---|---|
| | | backup | create | dataset | last | perform | replication | restore |
| Backup | create dataset backup | 0.4736 | 0.6228 | 0.6228 | 0 | 0 | 0 | 0 |
| Restore | restore last backup | 0.4736 | 0 | 0 | 0.623 | 0 | 0 | 0.62277 |
| Replication | perform replication | 0 | 0 | 0 | 0 | 0.707107 | 0.7071068 | 0 |

In Table 2, the second column represents historical test actions resulting from stopping words removing, the first column represents code fragment categories associated with the historical test actions, and the third to ninth columns represent the TF-IDF values for words in the three historical test actions. The third to ninth columns in the second row represent vectors associated with the historical test action "create a dataset and backup," i.e., (0.4736 0.6228 0.6228 0 0 0 0). The third to ninth columns in the third row represent vectors associated with the historical test action "restore the last backup," i.e.,(0.4736 0 0 0.623 0 0 0.62277). The third to ninth columns in the fourth row represent vectors associated with the historical test action "perform the replication," i.e., (0 00 0 0.707107 0.7071068 0).

Suppose a test action for verification of a software bug as determined based on an identification of the bug to be verified is: Create a full backup. After performing stopping words removing on the test action, Create full backup may be obtained. By calculating the TF-IDF value for each word in this test action, the test action is converted from text to a second vector (0.4481 0.5535 0 0.702 0 0 0 0). The second vector is appended to the last row in Table 2, and then Table 2 is updated to Table 3 as below:

TABLE 3

| Code fragment category | Test actions | Unique Words | | | | | | |
|---|---|---|---|---|---|---|---|---|
| | | backup | create | dataset | last | Perform | replication | restore |
| Backup | create dataset backup | 0.4481 | 0.5535 | 0.70203 | 0 | 0 | 0 | 0 |
| Restore | restore last backup | 0.4114 | 0 | 0 | 0 | 0.645 | 0 | 0 |
| Replication | perform replication | 0 | 0 | 0 | 0 | 0 | 0.707107 | 0.7071068 |

TABLE 3-continued

| Code fragment category | Test actions | Unique Words | | | | | | |
|---|---|---|---|---|---|---|---|---|
| | | backup | create | dataset | last | Perform | replication | restore |
| Unknown | create full backup | 0.4481 | 0.5535 | 0 | 0.702 | 0 | 0 | 0 |

By calculating Euclidean distances between the second vector in the last row and the three first vectors in the second to fourth rows in Table 3, Table 4 may be obtained as below:

TABLE 4

| | Historical test actions | | |
|---|---|---|---|
| New test actions | create dataset backup | restore last backup | perform replication |
| create full backup code Fragment category | 0.992827163 Backup | 1.277232687 Restore | 1.414213562 Replication |

For the sake of discussion, in Table 4, the test action for verification of the software bug which is determined based on the identification of the bug to be verified is referred to as "new test action." As seen from a comparison among the second to fourth columns in the second row of Table 4, the first vector associated with the historical test action "create a dataset and backup" has the nearest distance from the second vector associated with the new act "Create a full backup". Thus, the new act "Create a full backup" is associated with a code fragment category "Backup" associated with the historical test action "create a dataset and backup."

In the foregoing example, only one historical test action is associated with each code fragment category. In other embodiments, however, the plurality of historical test actions might be associated with each code fragment category. In such embodiments, the number of times that each of the plurality of historical test actions occurs may be determined, and then a historical test action that occurs most may be selected from the plurality of historical test actions.

In embodiments where test actions for verifying a software bug which are determined based on an identification of the software bug comprise a plurality of test actions, the similarity between each of the test actions and the plurality of historical test actions may be determined, and then each of the test actions is associated with one code fragment category. Code fragments in each code fragment category are combined to obtain an executable automation script, and the software bug is verified by running the automation script.

Returning to FIG. 1, in some embodiments, the computing device 100 further comprises a resource management module 140. The resource management module 140 is configured to determine information 116 of hardware resources for verifying the software bug based on the identification 112 of the bug to be verified, select corresponding hardware resources 142 from a hardware resource pool, and run the code fragment 122 of the code fragment category associated with the test action on the selected hardware resources 142, thereby verifying the software bug.

In some embodiments, the resource management module 140 is configured to utilize a software bug template which defines the test action 114 for verifying the software bug and the information 116 of hardware resources. An example of the software bug template is as below:

Hardware Resources:
Product: Avamar Server, Version:7.5.1
Product: Avamar Client, Version:7.5.1
Product: DataDomain, Version:6.1
Test actions:

Act 1: xxxxx $\vdots$

Act k: xxxxx

In some embodiments, the resource management module 140 is configured to store the information 116 of hardware resources for verifying the software bug by using the following matrix. In some embodiments, hardware resources may be pre-installed with a specific software version by automation scripts.

$$\text{Avamar Server:} \begin{pmatrix} \text{Host\_1} & \text{version\_1} & \text{Idle} \\ \text{Host\_2} & \text{version\_2} & \text{Idle} \\ \vdots & \vdots & \vdots \\ \text{Host\_x} & \text{version\_x} & \text{Idle} \end{pmatrix} \quad \text{Matrix 5}$$

$$\text{Avamar Client:} \begin{pmatrix} \text{Host\_1} & \text{version\_1} & \text{Idle} \\ \text{Host\_2} & \text{version\_2} & \text{Idle} \\ \vdots & \vdots & \vdots \\ \text{Host\_x} & \text{version\_x} & \text{Idle} \end{pmatrix} \quad \text{Matrix 6}$$

$$\text{Data Domain:} \begin{pmatrix} \text{Host\_1} & \text{version\_1} & \text{Idle} \\ \text{Host\_2} & \text{version\_2} & \text{Idle} \\ \vdots & \vdots & \vdots \\ \text{Host\_x} & \text{version\_x} & \text{Idle} \end{pmatrix} \quad \text{Matrix 7}$$

Matrices 5 to 7 work together as a hardware resource pool, wherein the last column of each matrix represents a status of a corresponding resource. For example, the status of a resource may be "Idle" or "Running."

In some embodiments, the resource management module 140 is configured to select hardware resources whose statuses are "Idle" based on Matrices 5 to 7 for software bug verification. If a hardware resource is selected, the resource management module 140 changes its status from "Idle" to "Running." In some embodiments, Matrices 5 to 7 may be stored in a remote database.

Figure 4:
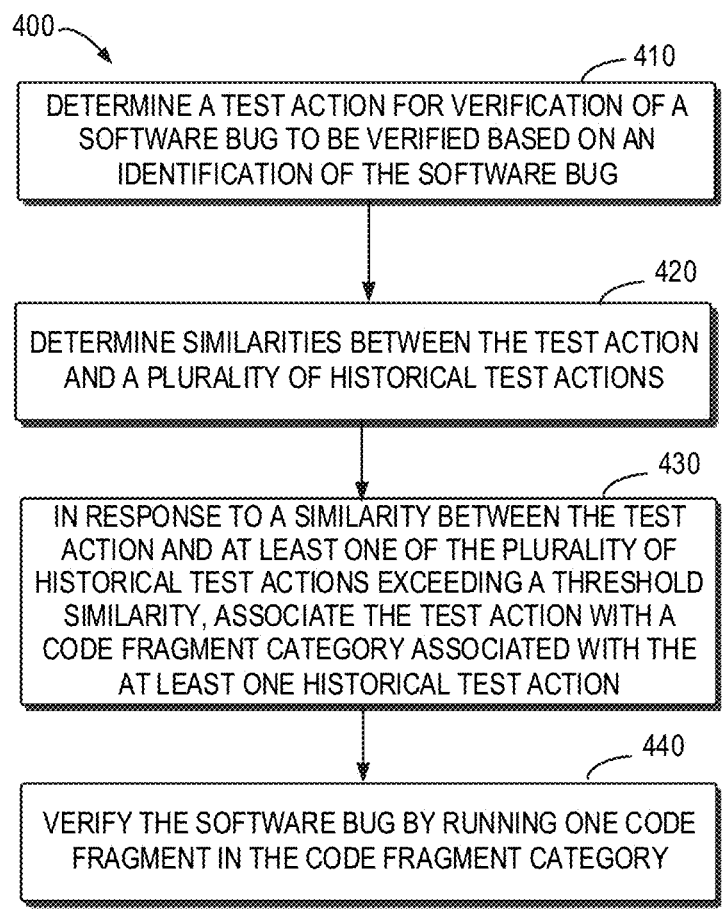
FIG. 4 shows a flowchart of a method for software bug verification according to embodiments of the present disclosure.

FIG. 4 shows a flowchart of a method 400 of verifying a software bug according to embodiments of the present disclosure. The method 400 may be implemented by the computing device 100. It should be understood the method 400 may further comprise additional steps that are not shown and/or may omit one or more steps that are shown, and the scope of the present disclosure is not limited in this regard. For the sake of discussion, the method 400 will be discussed in conjunction with FIG. 1.

At 410, the computing device 100 determines a test act for verification of a software bug to be verified based on an identification of the software bug. At 420, the computing device 100 determines similarities between the test act and a plurality of historical test acts. At 430, in response to a similarity between the test act and at least one of the plurality of historical test acts exceeding a threshold similarity, the computing device 100 associates the test act with a code fragment category associated with the at least one historical test act. At 440, the computing device 100 verifies the software bug by running one code fragment in the code fragment category.

In some embodiments, determining similarities between the test action and the plurality of historical test actions comprises: converting texts of the plurality of historical test actions to a first plurality of vectors; converting a text of the test action to a second vector; and determining the similarities between the test action and the plurality of historical test actions based on distances between the second vector and the first plurality of vectors.

In some embodiments, associating the test action with the code fragment category includes: in response to similarities between the test action and a first number of historical test actions among the plurality of historical test actions exceeding the threshold similarity, determining code fragment categories associated with the first number of historical test actions, determining the number of historical test actions associated with each of the determined code fragment categories, and in response to a proportion of the number of historical test actions associated with a first one of the determined code fragment categories to the first number being greater than a threshold proportion, associating the test action with the first code fragment category.

In some embodiments, the method 400 further includes associating more than one of the plurality of historical test actions with each of the plurality of code fragment categories by clustering code fragments associated with the plurality of historical test actions into the plurality of code fragment categories.

In some embodiments, the method 400 further includes determining hardware resources for verification of the software bug to be verified based on the identification of the software bug, selecting the hardware resources from a hardware resource pool, and running the code fragment on the selected hardware resources.

It should be understood that the details about the embodiments of the present disclosure as described with reference to FIG. 1 are also applicable to the method 400, and thus are not repeated herein.

Figure 5:
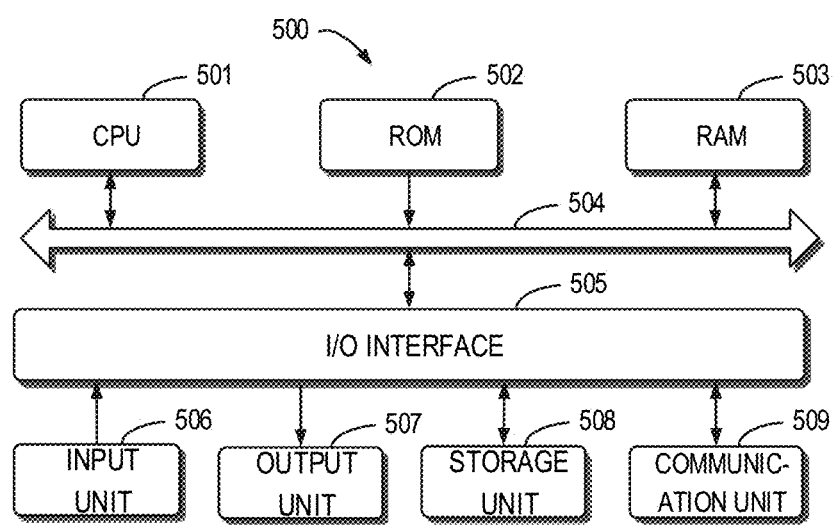
FIG. 5 shows a schematic block diagram of a device which is applicable to implement embodiments of the present disclosure.

FIG. 5 schematically shows a block diagram of a device 1100 which is applicable to implement embodiments of the present disclosure. As shown, the device 500 includes: Central Process Unit (CPU) 501, which may execute various appropriate actions and treatment according to computer program instructions stored in Read Only Memory (ROM) 502 or computer program instructions loaded from a memory unit 508 to Random Access Memory (RAM) 503. In the RAM 503, there may be stored various programs and data needed by operations of the device 500. The CPU 501, ROM 502 and RAM 503 are coupled to one another via a bus 504. An input/output (I/O) interface 505 is also coupled to the bus 504.

The plurality of components in the device 500 are coupled to the I/O interface 505, including: an input unit 506, such as a keyboard, a mouse, etc.; an output unit 507, such as various types of displays and loudspeakers, etc.; a memory unit 508, such as a magnetic disk, an optical disk, etc.; and a communication unit 509, such as an Internet card, a modem, a wireless communication transceiver, etc. The communication unit 509 allows the device 500 to exchange information/data with other device by means of a computer network such as the Internet and/or various telecommunication networks.

Various processes and treatment described above, for example, the method 400, may be executed by the process unit 501. For example, in some embodiments, the method 400 may be implemented as a computer software program, which is tangibly embodied on a machine readable medium such as the memory unit 508. In some embodiments, part or all of the computer program may be loaded and/or installed to the device 500 via the ROM 502 and/or the communication unit 509. The computer program, when loaded to the RAM 503 and executed by the CPU 501, may perform one or more steps of the method 400 described above.

As used herein, the term "comprise" and its variants are to be read as open terms that mean "include, but is not limited to". The term "based on" is to be read as "based at least in part on". The term "one embodiment" and "the embodiment" are to be read as "at least one embodiment". The terms "first", "second" and the like are used to indicate different or the same objects. Other definitions, explicit and implicit, may be included below.

As used herein, the term "determine" covers various actions. For example, "determine" may comprise computing, calculating, process, deriving, investigating, lookup (e.g. lookup in a table, database or another data structure), ascertaining, etc. In addition, "determine" may comprise receiving (e.g. receiving information), accessing (e.g. accessing data in memory), etc. Furthermore, "determine" may comprise parsing, choosing, selecting, establishing, etc.

Note the embodiments of the present disclosure can be implemented in software, hardware or combination of software and hardware. The hardware portion can be implemented by using dedicated logic; the software portion can be stored in a memory and executed by an appropriate instruction executing system such as a microprocessor or specially-designed hardware. Those skilled in the art may appreciate the device and methods may be implemented using computer executable instructions and/or included in processor control code, which is provided on, for example, programmable memory or a data carrier such as an optical or electronic signal carrier.

Further, while operations of the methods of the present disclosure are depicted in a particular order in the accompanying drawings, this does not require or suggest that such operations be performed in the particular order or that all illustrated operations be performed to achieve desirable results. On the contrary, the steps depicted in the flowchart may be executed in a different order. Additionally or alternatively, some steps may be omitted, the plurality of steps may be combined into one step, and/or one step may be decomposed into the plurality of steps. Further note that features and functions of two or more means according to the present disclosure may be embodied in one means. Conversely, features and functions of one means described above may be embodied in the plurality of means.

Although the present disclosure has been described with reference to several specific embodiments, it should be appreciated that the present disclosure is not limited to the disclosed specific embodiments. The present disclosure is intended to cover various modifications and equivalent arrangements included within the spirit and scope of the appended claims.

We claim:

1. A method for software bug verification, comprising:
crawling software bug information from a software bug management tool based on an identification of a software bug to be verified;
determining a test action for verification of the software bug to be verified based on the software bug information;
determining similarities between the test action and a plurality of historical test actions, wherein determining similarities between the test action and the plurality of historical test actions comprises:
   converting texts of the plurality of historical test actions to a first plurality of vectors by calculating a word frequency-inverse document frequency (TF-IDF) for each word in the texts of the plurality of historical test actions;
   converting a text of the test action to a second vector by calculating the TF-IDF for each word in the text of the test action; and
   determining the similarities between the test action and the plurality of historical test actions based on Euclidean distances between the second vector and each of the first plurality of vectors using the calculated TF-IDFs;
in response to a similarity between the test action and at least one of the plurality of historical test actions exceeding a threshold similarity, associating the test action with a code fragment category associated with the at least one of the plurality of historical test actions; and
verifying the software bug by running one code fragment in the code fragment category.

2. The method according to claim 1, wherein associating the test action with the code fragment category comprises:
in response to similarities between the test action and a first number of historical test actions among the plurality of historical test actions exceeding the threshold similarity, determining code fragment categories associated with the first number of historical test actions;
determining a number of historical test actions associated with each of the determined code fragment categories; and
in response to a proportion of the number of historical test actions being associated with a first one of the determined code fragment categories being greater than a threshold proportion, associating the test action with the first code fragment category.

3. The method according to claim 1, further comprising:
associating more than one of the plurality of historical test actions with each of the code fragment categories by clustering code fragments associated with the plurality of historical test actions into the code fragment categories.

4. The method according to claim 1, further comprising:
determining hardware resources for verification of the software bug to be verified based on the identification of the software bug;
selecting the hardware resources from a hardware resource pool; and
running the code fragment on the selected hardware resources.

5. An electronic device, comprising:
at least one processor; and
at least one memory comprising computer program instructions, the at least one memory and the computer program instructions being configured to, with the at least one processor, cause the device to perform a method, the method comprising:
   crawling software bug information from a software bug management tool based on an identification of a software bug to be verified;
   determining a test action for verification of the software bug to be verified based on the software bug information;
   determining similarities between the test action and a plurality of historical test actions, wherein determining similarities between the test action and the plurality of historical test actions comprises:
      converting texts of the plurality of historical test actions to a first plurality of vectors by calculating a word frequency-inverse document frequency (TF-IDF) for each word in the texts of the plurality of historical test actions;
      converting a text of the test action to a second vector by calculating the TF-IDF for each word in the text of the test action; and
      determining the similarities between the test action and the plurality of historical test actions based on Euclidean distances between the second vector and each of the first plurality of vectors using the calculated TF-IDFs;
   in response to a similarity between the test action and at least one of the plurality of historical test actions exceeding a threshold similarity, associating the test action with a code fragment category associated with the at least one of the plurality of historical test actions; and
   verifying the software bug by running one code fragment in the code fragment category.

6. The electronic device according to claim 5, wherein associating the test action with the code fragment category comprises:
in response to similarities between the test action and a first number of historical test actions among the plurality of historical test actions exceeding the threshold similarity, determining code fragment categories associated with the first number of historical test actions;
determining a number of historical test actions associated with each of the determined code fragment categories; and
in response to a proportion of the number of historical test actions being associated with a first one of the determined code fragment categories being greater than a threshold proportion, associating the test action with the first code fragment category.

7. The electronic device according to claim 5, wherein the method further comprises:
associating more than one of the plurality of historical test actions with each of the fragment categories by clustering code fragments associated with the plurality of historical test actions into the code fragment categories.

8. The electronic device according to claim 5, wherein the method further comprises:
determining hardware resources for verification of the software bug to be verified based on the identification of the software bug;
selecting the hardware resources from a hardware resource pool; and
running the code fragment on the selected hardware resources.

9. A computer program product being tangibly stored on a non-transient computer readable medium and comprising machine executable instructions which, when executed, cause a machine to perform steps of a method, the method comprising:
- crawling software bug information from a software bug management tool based on an identification of a software bug to be verified;
- determining a test action for verification of the software bug to be verified based on the software bug information;
- determining similarities between the test action and a plurality of historical test actions, wherein determining similarities between the test action and the plurality of historical test actions comprises:
  - converting texts of the plurality of historical test actions to a first plurality of vectors by calculating a word frequency-inverse document frequency (TF-IDF) for each word in the texts of the plurality of historical test actions;
  - converting a text of the test action to a second vector by calculating the TF-IDF for each word in the text of the test action; and
  - determining the similarities between the test action and the plurality of historical test actions based on Euclidean distances between the second vector and each of the first plurality of vectors using the calculated TF-IDFs;
- in response to a similarity between the test action and at least one of the plurality of historical test actions exceeding a threshold similarity, associating the test action with a code fragment category associated with the at least one of the plurality of historical test actions; and
- verifying the software bug by running one code fragment in the code fragment category.

10. The computer program product according to claim 9, wherein associating the test action with the code fragment category comprises:
- in response to similarities between the test action and a first number of historical test actions among the plurality of historical test actions exceeding the threshold similarity, determining code fragment categories associated with the first number of historical test actions;
- determining a number of historical test actions associated with each of the determined code fragment categories; and
- in response to a proportion of the number of historical test actions being associated with a first one of the determined code fragment categories being greater than a threshold proportion, associating the test action with the first code fragment category.

11. The computer program product according to claim 9, the method further comprising:
- associating more than one of the plurality of historical test actions with each of the code fragment categories by clustering code fragments associated with the plurality of historical test actions into the code fragment categories.

12. The computer program product according to claim 9, the method further comprising:
- determining hardware resources for verification of the software bug to be verified based on the identification of the software bug;
- selecting the hardware resources from a hardware resource pool; and
- running the code fragment on the selected hardware resources.

* * * * *